United States Patent [19]
Bender et al.

[11] Patent Number: 5,689,587
[45] Date of Patent: Nov. 18, 1997

[54] METHOD AND APPARATUS FOR DATA HIDING IN IMAGES

[75] Inventors: Walter Bender, Auburndale, Mass.; Norishige Morimoto, Tokyo, Japan; Daniel Gruhl, Cambridge, Mass.

[73] Assignee: Massachusetts Institute of Technology, Cambridge, Mass.

[21] Appl. No.: 599,254

[22] Filed: Feb. 9, 1996

[51] Int. Cl.⁶ .............................. G06K 9/36; G06F 7/58; G06F 101/14
[52] U.S. Cl. .............................................. 382/232; 380/54
[58] Field of Search .................. 382/232, 260, 382/261; 283/73; 380/18, 46, 54; 364/260.81, 949.71, 224.21, 717, 717.5

[56] References Cited

U.S. PATENT DOCUMENTS

| | | | |
|---|---|---|---|
| 4,499,551 | 2/1985 | Frank | 364/717 |
| 4,673,975 | 6/1987 | Inaba et al. | 380/14 |
| 4,783,840 | 11/1988 | Song | 382/261 |
| 5,243,423 | 9/1993 | DeJean et al. | 348/473 |
| 5,398,283 | 3/1995 | Virga | 380/18 |

FOREIGN PATENT DOCUMENTS

| | | | |
|---|---|---|---|
| 581317A2 | 2/1994 | European Pat. Off. | G07D 7/00 |

*Primary Examiner*—Jose L. Couso
*Assistant Examiner*—Timothy M. Johnson
*Attorney, Agent, or Firm*—Cesari and McKenna, LLP

[57] ABSTRACT

A method of hiding a pattern in a host image increases and decreases parameter values at randomly selected host image locations assigned to respective first and second groups. The alteration modifies the statistical behavior of a test statistic equivalent to a linear combination of a large number of instances of respective functions, associated with the pattern, of the parameter values at first and second group locations. The presence or absence of the pattern in a test image is determined by comparing the experimental value of the test statistic associated with the pattern with the expected value of the same sum for an unaltered host image.

85 Claims, 5 Drawing Sheets

METHOD AND APPARATUS FOR DATA HIDING IN IMAGES

FIELD OF THE INVENTION

This invention relates to steganography. More particularly, this invention relates to techniques for embedding data in still images in a manner that is resistant to tampering and image modification.

BACKGROUND OF THE INVENTION

The digital representation of data has advanced the efficient and widespread distribution of information. This enhanced availability is, in general, desirable. However, facile access to data also presents an increased opportunity for copyright violation. The possibility of unauthorized use of such widely available data has created a demand for reliable and economical methods for incorporating and detecting signature information in data amenable to electronic distribution. Such a signature could be used, for example, to mark photographs or other types of images as proprietary material before electronic publication or distribution through on-line services. The presence of the signature in a suspect image may serve, for example, to verify illegitimate use of that image. Also, different versions of the same image may be marked with different signatures to identify different routes of distribution.

Data hiding is a class of processes used to embed recoverable (e.g., signature) data in digitally represented information, such as a host image, with minimal degradation to the host information. Although the changes introduced by embedded data may be perceptible by a human observer, they need not be conspicuous or objectionable. The goal of data hiding is not to restrict access to the host information, but rather to make it impossible to distribute the host information without the embedded data. The ability to embed inconspicuous data makes data hiding attractive for adding signature information in images.

It is to be anticipated that after receiving the signature information, the encoded image will undergo intentional and inadvertent modification due, for example, to channel noise, filtering, resampling, rotation, cropping, lossy compression, or digital-to-analog (or analog-to-digital) conversion. In order to be effective, the data hiding technique should embed the signature information in a manner that allows determination of its presence or absence even after such modifications. For the present application, it is especially important that the technique also be resistant to attempts by an unauthorized user to obscure or eliminate the embedded data.

Many known data-hiding techniques are deficient in that the embedded data is not resistant to removal by lossy compression, e.g., by JPEG coding, one of the most widely used of such techniques for still images. The JPEG method applies a discrete cosine transform ("DCT"), closely related to a discrete Fourier transform, to nonoverlapping blocks of the image. A quantizer value is then applied to each coefficient of the transform to perform frequency-adaptive weighting. The weighting removes subjective redundancies in the image in order to optimize the visual quality of the decoded image for a given bit rate. The human visual system is less sensitive to reconstruction errors related to luminance variations of high spatial frequency than to those of low spatial frequency. JPEG's emphasis on preserving low DCT coefficients at the expense of higher ones exploits this differential sensitivity.

One class of techniques that is known to resist JPEG is direct-sequence modulation spread-specimen methods. These embed data by adding to the host information a composite signal formed by linearly modulating a sequence of pseudo-random numbers onto a sequence of code signals. Decoding includes correlation of the test image data with the composite signal. These techniques allow direction of embedded data to frequency ranges that are less likely to be attenuated by anticipated future processing, and so can avoid loss of the data by lossy compression. Also, because decoding requires knowledge of the added composite signal, the embedded data is difficult to detect and deliberately remove. Nonetheless, decoding is problematic because it requires exact pixel-wise registration of the test image with the host image. Efficacious testing of an image that has been subjected to modifications such as filtering, cropping, rotation, or rescaling would require complete knowledge of the details of the modification.

DESCRIPTION OF THE INVENTION

Summary of the Invention

The invention embeds one bit, a pattern indicating the presence or absence of a specific signature pattern, in a host image in a manner that allows its detection by exploiting the behavior of sums of a large number of random variables. Specifically, the data-embedding technique requires altering characteristic parameter values at a set of pseudo-randomly chosen locations in the host image in a manner that markedly changes the expectation value of some linear combination of mathematical functions of the values at that set of locations. The embedded signature is recoverable from a test image by calculating an experimental value of a linear combination of a large number of instances of the functions and comparing the experimental value with the expectation value of the sum for the unaltered host image.

The embedding is done by first randomly selecting a large number of locations in the host image, for example by associating locations in the image with members of a series of pseudo-random numbers. In the general case, the locations are partitioned into first and second groups. The host image is then altered by increasing the values of the characteristic parameter at locations belonging to the first group and decreasing the values of the same parameter at locations belonging to the second group. For digitally encoded images, the locations correspond to patches (i.e., groupings) of adjacent pixels.

Decoding entails determining whether or not a test image includes the embedded pattern. To decode, the selection and partition of locations generated during the embedding process is recreated, for example, by supplying a key specific to the pattern to a pseudo-random number generator and then applying the partition procedure. The decoder then calculates an experimental value of a test statistic, formulated to reflect the alterations to the host image associated with the statistic, of the parameter values assessed at the selected locations in the test image. Generally, the test statistic is equivalent to a linear combination of many instances of respective functions of the parameter values of locations belonging to the first and second groups. For example, since the parameter values of the first group locations are all increased and those of the second group all decreased, an appropriate function would be the difference between the sums of the parameter values over the first and second group locations. This calculation does not require the decoder to have the host image.

If the probability density functions of the parameter at all locations have finite expected value and variance and are identical and independent of the values assumed at other locations, then a test statistic equal to the sum of a large number of instances of a linear combination of the parameters assumes a Gaussian form. This property facilitates determining quantitatively whether the observed value of the test statistic indicates operation of the probability density function associated with the unaltered host image or of the shifted density associated with the embedded pattern. A Gaussian description may be appropriate even for statistics that do not conform to the restrictions just listed. Furthermore, even a nonGaussian statistic can adequately differentiate between an unshifted and a shifted probability density function. The likelihood of an observed experimental value's belonging to a density of known expected value can be bounded using the Chebyshev inequality, for example.

The reliance of the decoding on the statistical properties of combinations of many numbers renders data embedded according to the invention resistant to defeat by degradation of the image carrying the pattern. The express knowledge of the location selection and partition as well as of the specific alteration to the parameter values that is required to reverse the encoding makes the embedded bit resistant to intentional removal from the altered host image. Applying the changes to patches protects the embedded bit from obliteration by lossy compression, tone correction, filtering, cropping, and affine transformation.

BRIEF DESCRIPTION OF THE DRAWINGS

The foregoing discussion will be understood more readily from the following detailed description of the invention, when taken in conjunction with the accompanying drawings, in which.

Figure 1:
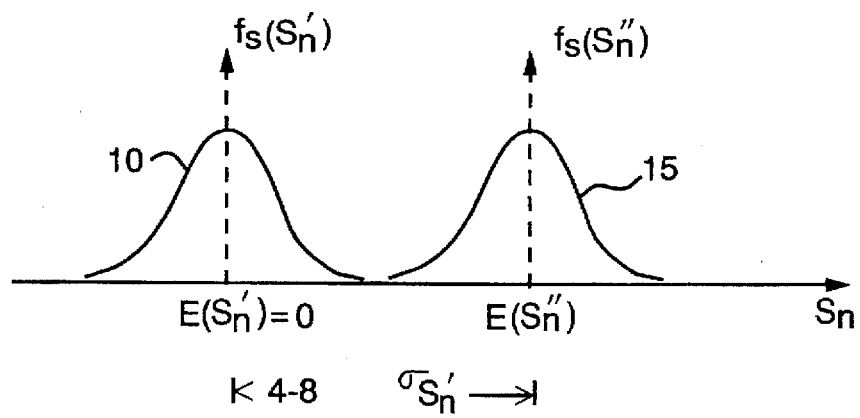
FIG. 1 graphically depicts the effect of encoding on the probability density function of the sum of pixel parameter differences.

It will be appreciated that, for purposes of illustration, these figures are not necessarily drawn to scale.

DETAILED DESCRIPTION OF THE INVENTION

For a pair of locations A and B, selected randomly from an image, the difference s can be defined as follows:

$$s = a - b \qquad \text{equation 1}$$

wherein a and b are equal to the values of a characteristic parameter, such as luminance or chrominance, associated with locations A and B, respectively. If a and b are random variables with identical probability density functions, the parameter value difference s is a random variable with an expected value E(s) equal to zero with variance $\sigma_s^2$:

$$\sigma_s^2 = \sigma_a^2 + \sigma_b^2 = 2\sigma_a^2 \qquad \text{equation 2}$$

If the parameter at each location in the image conforms to a 256-level linearly quantized system starting at zero with all values equally likely, a has variance $$\sigma_a^2 = \frac{(255 - 0)^2}{12} \approx 5418, \qquad \text{equation 3}$$

so that the standard deviation $\sigma_s$ is about 104. This value indicates that the values of s observed experimentally for a collection of individual pairs A and B would not closely cluster about the expected value but rather would be widely spread across the possible range of s values. The nature of the uniform probability density function ("PDF") governing the luminance values limits the useful information available from any single calculation of s.

However, the Gaussian behavior of sums of large numbers of random variables enhances the utility of the information available from the aggregate of the differences of many such pairs. If a set of n samples, each sample being a pair of image locations $A_i$ and $B_i$ (i=1, 2, . . . n), having respective parameter values $a_i$ and $b_i$, are randomly selected from an image, then the sum of parameter differences $S_n$ can be defined for the set of samples:

$$S_n = \sum_{i=1}^{n} (a_i - b_i) = \sum_{i=1}^{n} s_i. \qquad \text{equation 4}$$

For parameter values $a_i^o$ and $b_i^o$, conforming to the uniform PDF described above for a, in an unaltered host image, the random variable $S_n'$ represents the sum of the differences:

$$S_n' = \sum_{i=1}^{n} (a_i^o - b_i^o). \qquad \text{equation 5}$$

The expected value of $S_n'$ is then $$E(S_n') = n \times E(s) = n \times 0 = 0 \qquad \text{equation 6}$$

and its variance is $$\sigma_{S_n}^2 = n \times \sigma_s^2, \qquad \text{equation 7}$$

so that the standard deviation is $$\sigma_{S_n'} = \sqrt{n} \times \sigma_s \approx \sqrt{n} \times 104 \qquad \text{equation 8}$$

Equation 8 indicates that the breadth of the density function of $S_n'$ about the expected value for a particular sample set grows as the square root of n, whereas the range of possible $S_n'$ values grows as n. In other words, the density function becomes more sharply peaked about the expectation value as n increases. For sufficiently large n, the PDF of $S_n'$ assumes a Gaussian envelope. Thus, about 98% of the probability density of a Gaussian distribution lies within two standard deviations of the expected value of the random variable.

The invention capitalizes on the sharpness of the $S_n'$ density function by altering the host image so as to change the PDF underlying the sum of the parameter differences $S_n$ from that of $S_n'$ to a function that produces very different experimental values of the test statistic $S_n$ for a particular sample set associated with a specific pattern to be encoded in the host image. The presence or absence of the encoded pattern in a test image is detected by calculating an experimental value of $S_n$ for the associated sample set and interpreting its deviation from $E(S_n')=0$. A large deviation from zero is unlikely to occur by chance and indicates to a high degree of certainty the presence of the pattern.

Thus, in one exemplary embodiment, the pattern is encoded by altering the host image according to the following procedure: 1) designating a sample set of pairs of randomly selected image locations $A_i$ and $B_i$ to be associated with the pattern; 2) increasing the parameter value $a_i$ at each location $A_i$ in the sample set from its initial value $a_i^o$ by some positive quantity $\delta_a$; 3) decreasing the parameter value $b_i$ at each location $B_i$ in the sample set from its initial value $b_i^o$ by some positive quantity $\delta_b$. The random variable $S_n''$ represents the resulting parameter differences:

$$S_n'' = \sum_{i=1}^{n}(a_i - b_i) = \sum_{i=1}^{n}[(a_i^o + \delta_a) - (b_i^o - \delta_b)] = (\delta_a + \delta_b)n + \sum_{i=1}^{n}(a_i^o - b_i^o). \quad \text{equation 9}$$

Because, as indicated by equation 5, the second term of equation 9 is zero, the expectation value $E(S_n'')$ for the sample set corresponding to the embedded pattern in the altered host image is $$E(S_n'')=(\delta_a+\delta_b)n \quad \text{equation 10}$$

For each pair of locations included in the sample set, the expectation is shifted positively by $(\delta_a+\delta_b)$.

The ratio $$y = \frac{E(S_n'')-E(S_n')}{\sigma_{S_n'}} = \frac{(\delta_a+\delta_b)n}{\sqrt{n\sigma_r}} \approx 0.014(\delta_a+\delta_b)\sqrt{n} \quad \text{equation 11}$$

reveals that for a sufficiently large sample size n, the expectation value of $S_n''$ is shifted positively with respect to zero by several standard deviations of the $S_n'$ density function 10 of the unaltered host image, as shown in FIG. 1. Therefore, for large n, there is insignificant overlap between the ranges of the $S_n'$ PDF 10 of the original host image and the $S_n''$ PDF 15 of the altered image.

This segregation facilitates determining which of the two probability density functions, and thus whether the original or altered host image, has generated a given experimental value of the test statistic $S_n$ calculated for the designated sample set. The table below shows the effect of typical parameter alterations of $\delta_a=\delta_b=\delta=2$ on $E(S_n'')$ for sample set of n pairs. If the PDF of $S_n'$ is approximately Gaussian, then the probability that an experimental value equal to $E(S_n'')$ does not belong to that PDF, i.e., the certainty of encoding, is equal to the Gaussian cumulative distribution function $\phi(y)$.

| sample size n | normalized shift in expectation y (equation 11) | certainty of encoding $\Phi(y)$ |
|---|---|---|
| 0 | 0 | 50.00% |
| 319 | 1 | 84.13% |
| 1276 | 2 | 97.72% |
| 2870 | 3 | 99.87% |

The uniform PDFs assumed for $a_i^o$ and $b_i^o$ in the foregoing analysis represent a worst case for the detectability of the encoded signature pattern. In fact, detection is facilitated as the luminance values in the original host image approach a PDF sharply peaked around a single luminance value (i.e., as the tonality of the image approaches uniformity). Yet, even with uniform PDFs, the aggregate effect of the changes in a sample set of only a few thousand pairs, even for values of $\delta$ smaller than 5 parts out of 256, is easily detectable. Even when the data from entire regions of the image are completely eliminated so that only some of the n pairs can be observed, (e.g., due to post-encoding cropping), the reliability of the test only degrades as the natural logarithm of the test image size. For large values of n, the presence of the signature can cause an experimental value of $S_n$ removed several standard deviations from the expected value of $S_n'$ even if the test image data has been corrupted to the extent that the commercial value of the image has been compromised.

Large values of $\delta$ also promote ready interpretation of the experimental value, but the range of practical values is limited by the considerations of visibility of the alterations to the host image. In this respect, the present invention is especially amenable to invisibly embedding a signature in a color image. The relative insensitivity of the eye to luminance value in color images allows the use of luminance changes of large $\delta$ without displaying the encoding. Data thus embedded by luminance alteration is not lost by removal of color from the image.

In order to determine whether or not the pattern has been embedded, knowledge of the sample set, including which of the selected locations were designated $A_i$ and which were designated $B_i$, is presumed. A convenient way of preserving this information is to first generate the pairings using a key for a known pseudo-random number generator, for example by designating alternate numbers in the pseudo-random number series $A_i$ and $B_i$. Since calculation of the test statistic does not actually require pairing the locations, another possibility is to designate the first n numbers in the series as $A_i$ and the second n numbers as $B_i$.

Knowledge of the key then enables recreation of the pairings for calculation of the experimental value of $S_n$. However, intelligence of $\delta$ is neither required nor helpful in decoding. Restricting knowledge of $\delta$ prevents automated tampering with an encoded image to reconstruct the original host image data without seriously degrading the image.

A statistic may be embedded using grouping schemes other than the pairings illustrated above. For example, the randomly generated locations may be partitioned into three groups, including n locations in each of two of the groups and 2n locations in the third group, so that each sample comprises locations $A_i$, $B_i$, $C_{2i-1}$ and $C_{2i}$. If the encoding increases the parameter value at each $A_i$ and $B_i$ and decreases the parameter value at each $C_{2i-1}$ and $C_{2i}$, then an experimental value of the statistic $$S_n = \sum_{i=1}^{n}(a_i+b_i-c_{2i-1}-c_{2i}) \quad \text{equation 12}$$

will indicate whether or not the test image has been encoded. For the unaltered host image, $$S_n' = \sum_{i=1}^{n}(a_i^o+b_i^o-c_{2i-1}^o-c_{2i}^o)$$

has expected value $E(S_n')=0$, and the expected value is shifted positively by $(\delta_a+\delta_b+2\delta_c)$ for every sample in the set.

It is not necessary that the probability density function of $S_n'$ be zerocentric, as long as its expected value is known. For example, for the three-way grouping just presented, if encoding instead increases the parameter value at each $A_i$ and decreases the parameter value at each $B_i$, $C_{2i-1}$ and $C_{2i}$, then the statistic of interest is $$S_n = \sum_{i=1}^{n} (a_i - b_i - c_{2i-1} - c_{2i}).$$ equation 13

The corresponding sum $$S_n' = \sum_{i=1}^{n} (a_i^o - b_i^o - c_{2i-1}^o - c_{2i}^o)$$

has expected value $$E(S_n') = E \sum_{i=1}^{n} (-c_{2i-1}^o - c_{2i}^o) = -2nE(c^o),$$

the numerical value of which depends on the probability density function underlying the parameter values in the host image. Each sample in the set adds $(\delta_a + \delta_b + 2\delta_c)$ to the expected value. The nonzero $E(S_n')$ does not at all hinder calculation of the normalized shift of equation 11 or of the cumulative distribution function to estimate the certainty of encoding.

This three-way grouping described by equation 13 could also be represented in terms of a two-group framework. An alpha group includes all of the locations at which parameter values are to be increased, namely the A locations, with $\alpha_j = \alpha_i$. A beta group includes all of the locations at which parameter values are to be decreased, namely the B and C locations, with $\beta_k b_i$ for k=1 to n; $\beta_k = c_{2i-1}$ for k=n+1 to 2n; and $\beta_k = c_{2i}$ for k=2n+1 to 3n. A test statistic equivalent to the one of equation 13 is $$S = \sum_{j=1}^{J} f(\alpha_j, j) - \sum_{k=1}^{K} g(\beta_k, k)$$ equation 14 with $f(a_j, j) = a_j$ and $g(\beta_k, k) = \beta_k$. In this case, J=n and K=3n. In terms of formulating a test statistic, the only meaningful distinction among points is the direction in which coding adjusts their parameter value. In this regard, the fact that the beta group includes points altered by two distinct values of $\delta$ is irrelevant.

The generalization of the technique can be summarized within a two-group framework as follows. The randomly chosen locations are divided into alpha and beta groups having respective parameter values $\alpha_j$ and $\beta_k$ which are respectively increased and decreased by encoding. It is not necessary that the sample set be decomposed into n distinct samples, of which each includes representatives from each group. Therefore, the numbers of locations belonging to the alpha and beta groups, J and K, may be unequal. Either of these groups may optionally encompass an arbitrary number of subgroups, each having its parameter values altered by a different magnitude by the encoding; and any subgroup may contain a number of locations different from the number contained by any other subgroup. The indicative experimental value S is equivalent to a linear combination of several instances of two arbitrary functions $f(a_j, j)$ and $g(\beta_k, k)$, which are not necessarily linear functions. It must be emphasized that although the functions $f(a_j, j)$ and $g(\beta_k, k)$ for the examples already given have been the identity function, this is not at all necessary. For example, an equally useful, though nonequivalent, formulation of the test statistic of equation 14 could include $g(\beta_k, k) = 3\beta_k$.

In a digitally represented image, the locations at which the parameter values are adjusted correspond to patches, each a region in the image including several pixels, rather than to ungrouped individual pixels. (In analog images, the distinction between points and patches is arbitrary.) This approach has several benefits. In general, it shifts the noise introduced by the encoding into lower spatial frequencies, so that it is less likely to be removed by low-pass operations such as lossy compression. More specifically, by design of the patch contour, (i.e., the variation of $\delta$ over the patch area), the patchwise embodiment allows targeting of a particular range of spatial frequencies to contain the embedded data. The lower-frequency nature of patchwise encoding accommodates higher values of $\delta$ without displaying the encoding. Spreading each parameter alteration over several pixels also makes the encoding less vulnerable to destruction by blurring, cropping, affine transformation, and gamma or tone correction.

Typically, the patch size scales with the dimensions of the image. In general, the patch size allowing the image to accommodate n equal to at least about 5,000 gives best results. In one approach, the patches are selected from cells defined by a grid mapped onto the image so as to assign each pixel of the image to a cell. Then the groupings used to specify the encoded pattern designate cells, of which the parameter values of the member pixels are altered. In decoding, the parameter value at an arbitrarily chosen position, such as the centroid of the patch, can be used to represent the patch in the experimental value of $S_n$, since the parameter values of all of the points in the patch have been altered in the same direction.

Figure 2A:
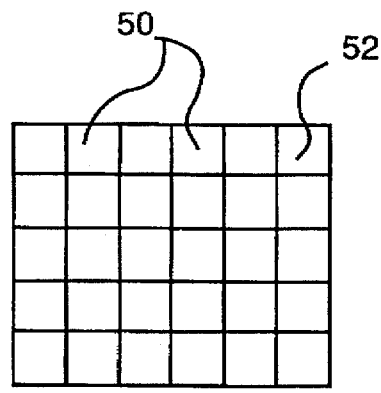
FIGS. 2A–2C schematically depict arrangements of patches across an image.
Figure 2B:
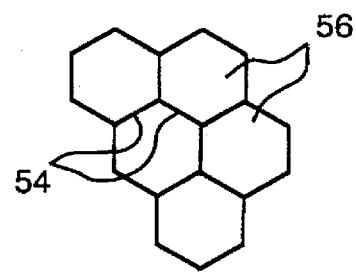

A simple rectilinear lattice defining square cells 50, as FIG. 2A shows. As the parameter values are altered over the patches defined by such a grid, the resulting discontinuity in, e.g. luminance, is concentrated in the regions near the corresponding cell borders 52. If n is large, so that most of the cells define altered patches, this lattice symmetry promotes visibility of the encoding. The symmetry of the hexagonal grid shown in FIG. 2B makes the border regions 54 between cells 56 less obvious to the eye.

Figure 2C:
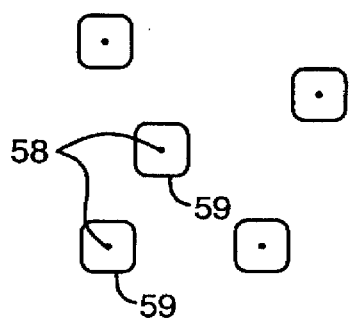

In another approach, the patches are scattered randomly across the image. If patches are constructed around points 58 randomly selected from all the points in the image, the result resembles the arrangement of patches 59 indicated by FIG. 2C. Such an arrangement minimizes the perceptible distortion introduced by encoding.

Figure 3A:
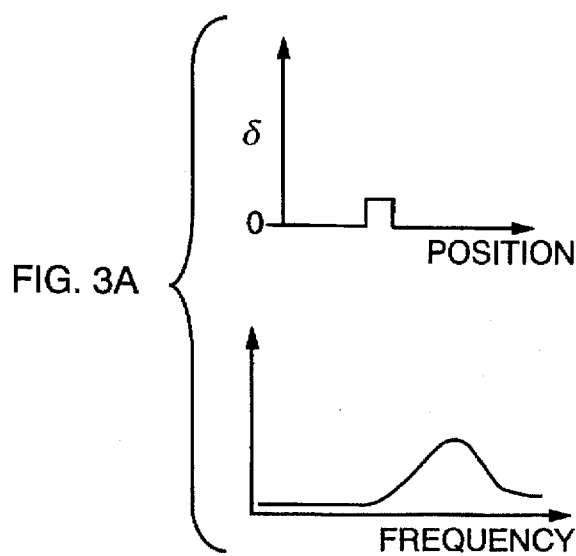
FIGS. 3A–3C graphically depict patch contours and their frequency spectra.
Figure 3B:
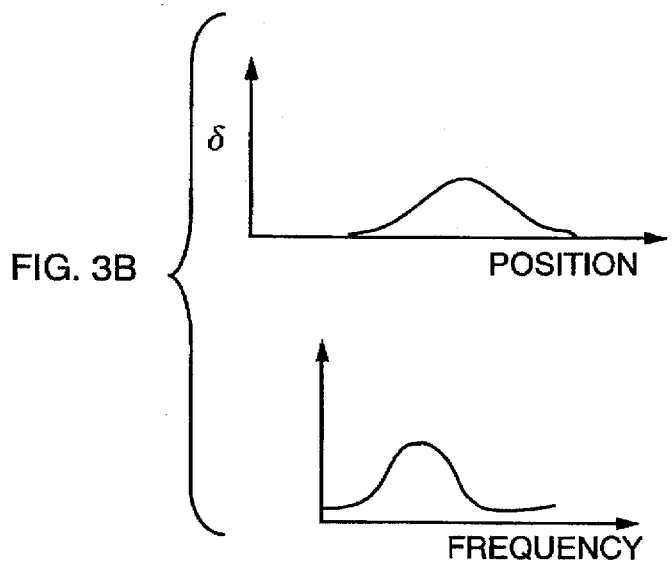
Figure 3C:
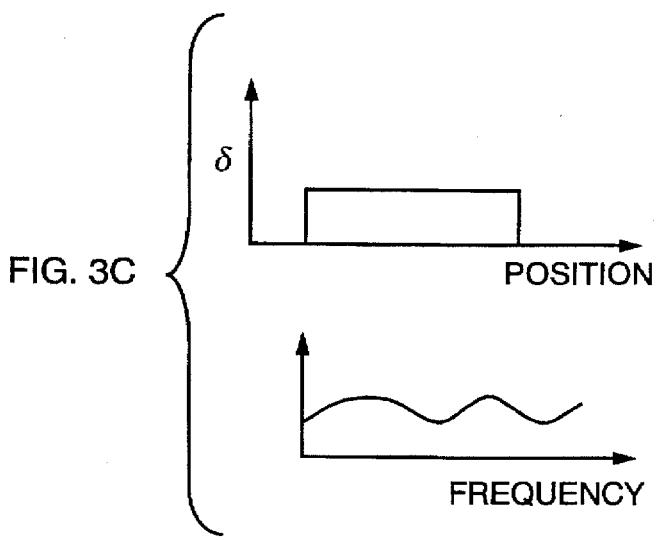

The contour of a patch largely determines which spatial frequencies will by modified by the encoding. FIGS. 3A–3C show 5, which can be represented graphically as the patch depth, as a function of position for three possible one-dimensional patch contours, and for each contour the approximate form of the frequency spectrum of a line over which such patches have been distributed in a pseudo-random manner. The patch demonstrated in FIG. 3A has sharp edges and covers a small area in the image. This contour concentrates most of the patch's energy in the higher-frequency portion of the image spectrum and thus increases the susceptibility of the encoding to removal by lossy compression. The broad, diffuse shape shown in FIG. 3B represents the other extreme, concentrating most of the information in lower frequencies. Data embedded using this profile is susceptible to corruption by operations such as contrast enhancement. The wide, sharp patch of FIG. 3C disperses the energy across the entire frequency spectrum. The patch contour should be chosen based on the modifications the image is expected to undergo after encoding. Spreading the patch energy across the spectrum is recommended if the post-encoding treatment of the image will include techniques affecting several spectral regions or is not known.

Patchwise parameter alteration allows the use of larger values of $\delta$, which promotes clean interpretation of the experimental value of $S_n$, without drawing attention to the encoding. The ability to adjust parameter values over a multi-pixel area allows smoother variation in patch depth around the edges of the patch. This rounding takes advantage of the lower sensitivity (about 1 part in 40) of the eye to smoothly changing luminance values compared to its sensitivity (about 1 part in 240) to discontinuous changes in a region of otherwise uniform luminance.

The use of patching imparts resistance to the encoded information against blurring, cropping, and affine transformations that is not attainable with pixel-wise parameter alteration. This principle is illustrated with respect to rotation by the two identical 4×4 rectangular grids shown in FIG. 4. The first grid 60 has been rotated about 10° clockwise with respect to a second grid 70 about their mutual center 65. The shaded regions 75 indicate the overlap between a given cell in the first lattice 60 and its analog in the second lattice 70. The overlap is substantial, and the center of every cell in the first lattice 60 falls in the corresponding cell in the second lattice 70.

Figure 4:
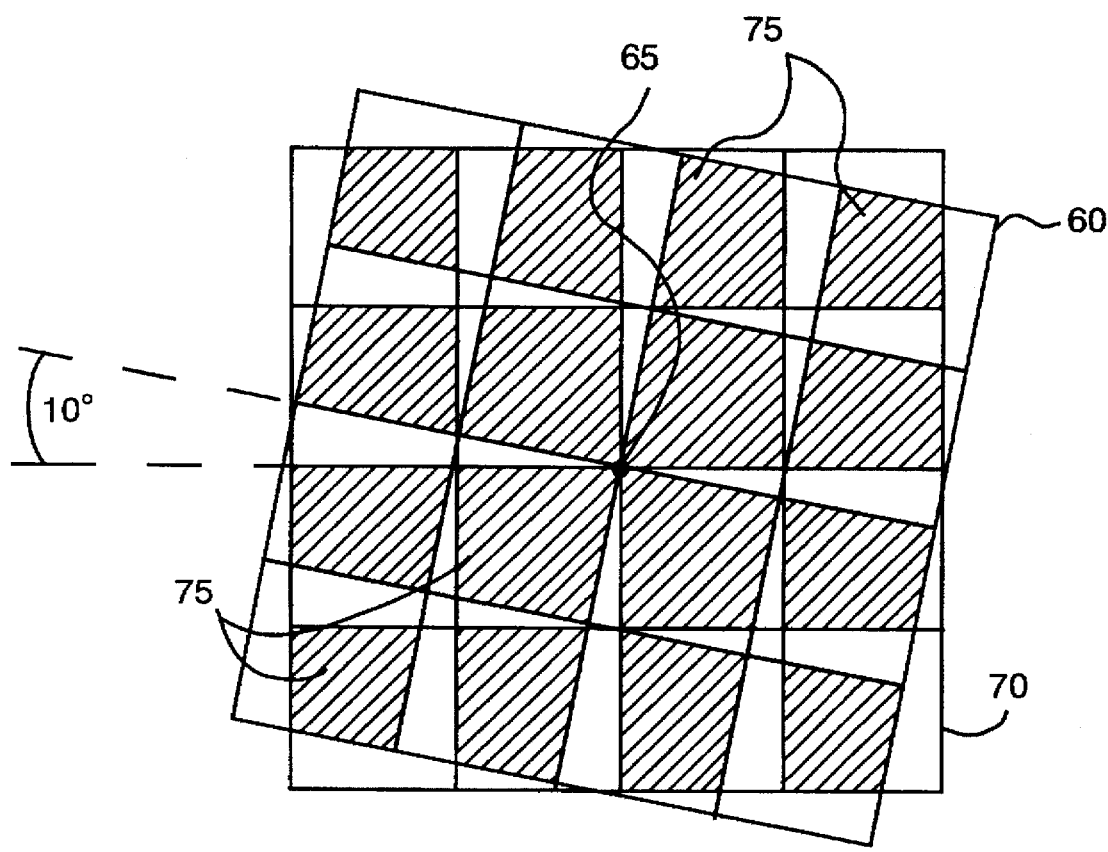
FIG. 4 illustrates the effect of rotation on the grid mapping.

If an image were rotated after encoding with patches conforming to a rectilinear grid as shown in FIG. 2A, the resulting relationship between the encoded host image and the rotated image would be as shown in FIG. 4. Testing the image for the embedded signature pattern first requires mapping a grid onto the test image. Without intelligence of the rotation undergone by the test image since encoding, the decoder would impose the rectilinear array used in the encoding on the image. Although the mapping thus imposed would not perfectly match that used for the encoding, the overlap between the patches of the two grids would allow calculation of a meaningful test statistic.

If the points to be examined for calculation of the test value are misidentified due to offset by cropping, translation, rotation, or scaling between the times of encoding and decoding, the utility of an experimental value of $S_n$ is degraded. The value of $S_n$ calculated in decoding is particularly sensitive to affine transformations undergone by the image. However, if information about the transformations undergone by the test image is available at decoding, the accuracy of the method in cases of post-encoding image alteration is improved. If a description of the geometrical transformation is available, the grid defining the patches can be adapted so that it better corresponds to that used for encoding. Moreover, if the original host image is available, the cropping or affine transformation may be determined by comparison of the test image with the original image, such as by using feature recognition techniques. Information about both cropping and affine transformations may also be recovered using affine coding, which uses a high bit-rate coding technique to embed a predefined reference pattern in the host image. Estimation of the geometric transformation undergone by the test image is achieved by comparing the original shape, size, and orientation of the reference pattern with that in the test image. Based on this information, an inverse affine transform can be applied to recover the original image, apart from portions removed by cropping.

The parameters governing the sample size and the size, shape, contour, and depth of the patches can all be determined algorithmically at encoding or decoding for a particular image, based on criteria incorporating the above-mentioned considerations.

The invention may also be used to advantage for marking photographs by embedding a signature pattern. One way of doing this is to embed the pattern on the photographic paper prior to exposing the paper to the negative image, thereby subjecting the paper to a double exposure: a first exposure to embed the signature and a second to transfer the image as usual. The embedding exposure provides a relatively low-level overall intensity that is uniform except for a pattern of regions of greater and lesser intensity arranged according to groupings of random locations as disclosed in the foregoing description. Later, the paper is exposed and the image developed as usual to produce a photograph. Another possibility is the construction of a digital camera that places a signature pattern on every photograph it takes. The signature can be decoded from any image suspected of being a copy of the photograph by examination of the image as already described.

Figure 5:
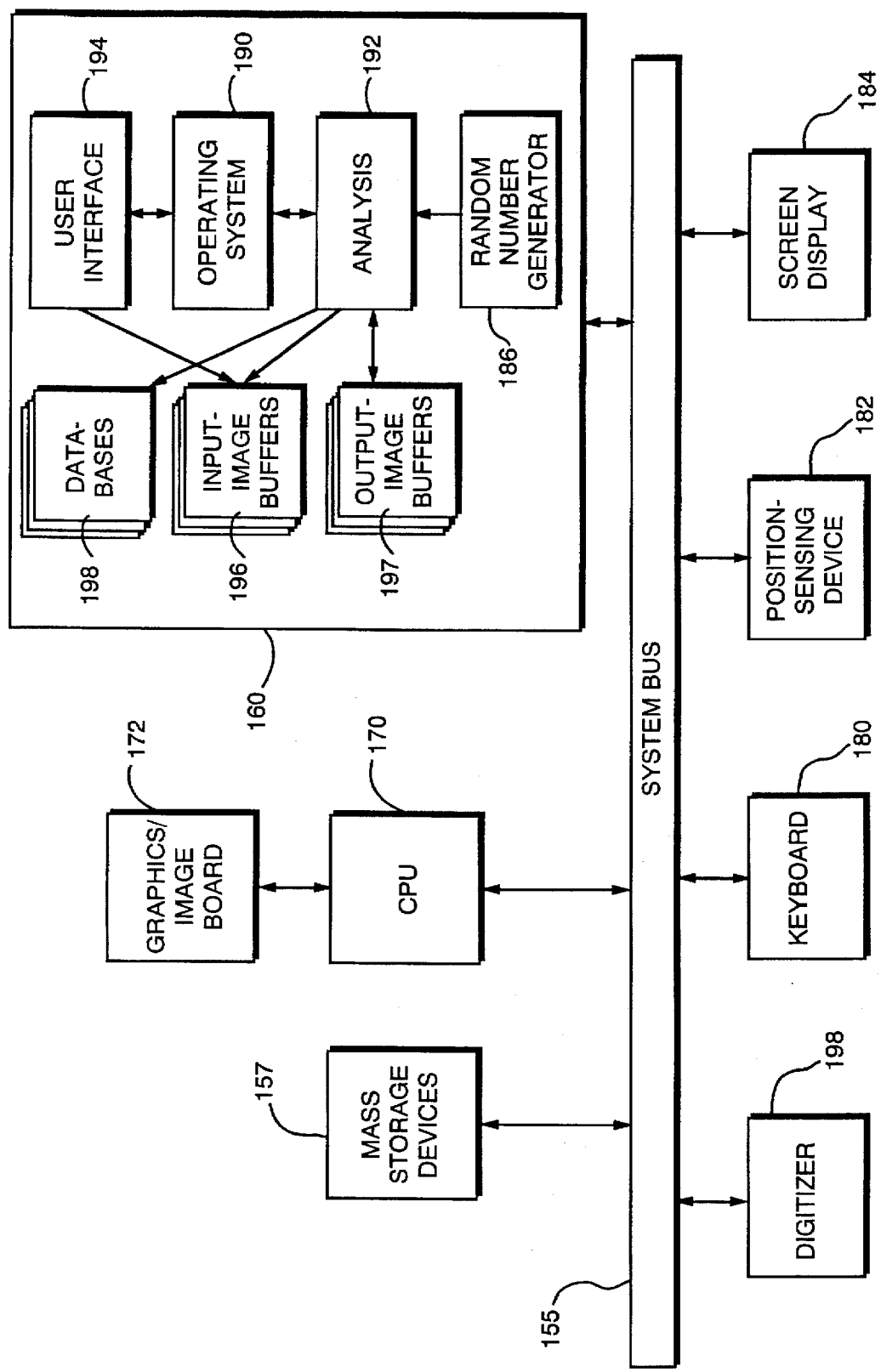
FIG. 5 schematically illustrates a representative hardware environment for the present invention.

Refer now to FIG. 5, which illustrates, in block-diagram form, a hardware system incorporating the invention. As indicated therein, the system includes a system bus 155, over which all system components communicate, a mass storage device (such as a hard disk or optical storage unit) 157 as well as a main system memory 160.

The operation of the illustrated system is directed by a central-processing unit ("CPU") 170. To facilitate rapid execution of the image-processing operations hereinafter described, the system preferably contains a graphics or image-processing board 172; this is a standard component well-known to those skilled in the art.

The user interacts with the system using a keyboard 180 and a position-sensing device (e.g., a mouse) 182. The output of either device can be used to designate information or select particular areas of a screen display 184 to direct functions to be performed by the system.

The main memory 160 contains a group of modules that control the operation of CPU 170 and its interaction with the other hardware components. An operating system 190 directs the execution of low-level, basic system functions such as memory allocation, file management and operation of mass storage devices 157. At a higher level, an analysis module 192, implemented as a series of stored instructions, directs execution of the primary functions performed by the invention, as discussed below: instructions defining a user interface 194 allow straightforward interaction over screen display 184. User interface 194 generates words or graphical images on display 184 to prompt action by the user, and accepts user commands from keyboard 180 and/or position-sensing device. A random number generator 186 creates the ordered series of pseudo-random numbers used in encoding or decoding.

The main memory 160 also includes one or more input image buffers 196 that contain image(s), such as a host or test image, used as input for processing according to the invention and output image buffers 197 that contain an output image generated by that processing. The contents of each input or output image buffer define a "raster," i.e., a regular two-dimensional pattern of discrete pixel positions that collectively represent an image and may be used to drive (e.g., by means of image-processing board 172 or an image server) screen display 184 to display that image. The values of pixel parameters, such as luminance, contained at each memory location in an image buffer 196 or 197 directly governs the appearance of a corresponding pixel on display 184.

One or more databases 198 contain encoding and/or decoding information, e.g., the output of the random number generator, the key used by it to generate the pseudo-random number series, the role governing assignment of patches to groups, the description of patches, the test statistic formulation and expected value or descriptions of geometric transformation. One or more of the databases 198 may be associated with each one of the image buffers 196 or 197 and contain information specific to the image contained in the associated buffer; or, one database 198 may contain information generic to all images encoded or decoded by the apparatus. The databases may be stored in the mass storage device 157 in file(s) linked to file(s) containing the associated image(s).

It must be understood that although the modules of main memory 160 have been described separately, this is for clarity of presentation only; so long as the system performs all necessary functions, it is immaterial how they are distributed within the system and its programming architecture. Likewise, although conceptually organized as grids, pixelmaps need not actually be stored digitally in this fashion. Rather, for convenience of memory utilization and transmission, the raster pattern is usually encoded as an ordered array of pixels.

The host or test image may be provided in electronic or hardcopy format, in which case the image is processed by a digitizer 198 before encoding or decoding. The digitized image is sent as bitstreams on the bus 155 to an image baffer 196 of the main memory 160. The source or test image may be stored in the mass storage device 157 as well as in image buffers 196.

As noted above, execution of the key tasks associated with the present invention is directed by analysis module 192, which governs the operation of CPU 170 and controls its interaction with main memory 160 in performing the steps necessary to encode a signature pattern in a host image or to detect the presence or absence of a signature pattern in a test image.

Figure 6:
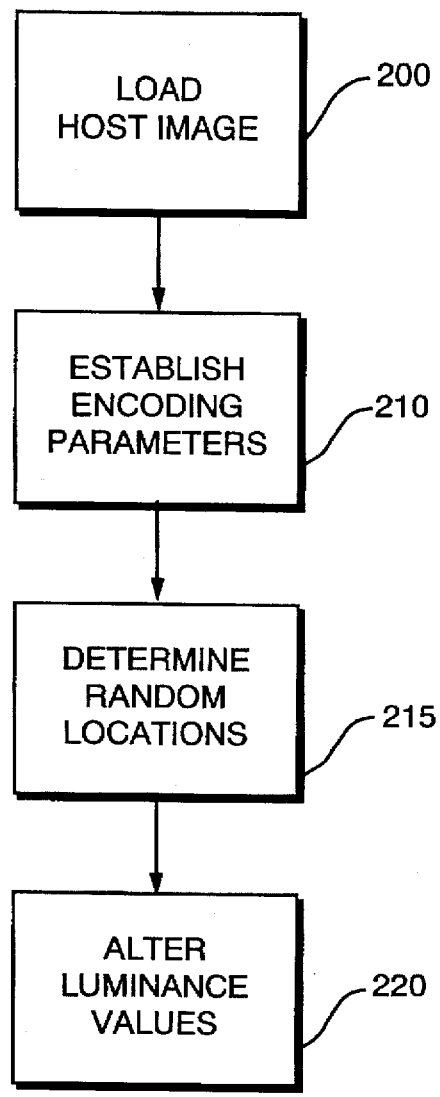
FIG. 6 is a flow chart illustrating encoding according to the invention.

In particular, the procedure followed by the hardware system for encoding a pattern in a host image is shown in FIG. 6. In a first step 200, the host image is loaded into a first one of input image buffers 196, so that it is available to analysis module 192. Then the module 192 establishes the encoding parameters in step 210. These parameters include the number, size, shape, arrangement, contour, and depths of the patches, the key for generating the pseudo-random number series in step 215, and the rule for assigning the numbers to the alpha and beta groups and any subgroups. In response to a user command, the module 192 either retrieves these parameters, from the user interface 194 or the appropriate database 198, or determines the appropriate parameters for encoding the host image based on the considerations outlined previously herein. If the chosen patch form so requires, this step also includes generating a grid defining the patches and mapping it onto the host image. The values determined for the parameters, as well as the entire series of pseudo-random numbers generated in step 215, may be retained in one of the databases 198.

In step 215, the random number generator 186 provides an ordered series of pseudo-random numbers, each interpreted to correspond to a location, a pixel or grid ceil, in the host image. The analysis module 192 assigns numbers in the series to alpha and beta groups to effect the assignment of locations to groups and any subgroups as described above. In step 220, the module 192 generates an output image by altering the pixel parameter values of the locations designated by the pseudo-random numbers generated in step 215 so as to embed the desired pattern. Specifically, the analysis module 192 changes the parameter values of the pixels associated with the generated pseudo-random numbers by increasing the values for pixels associated with numbers assigned to the alpha group and decreasing the values for pixels associated with numbers assigned to the beta group. The encoded output image is then stored in second one of the output image buffers 197.

Figure 7:
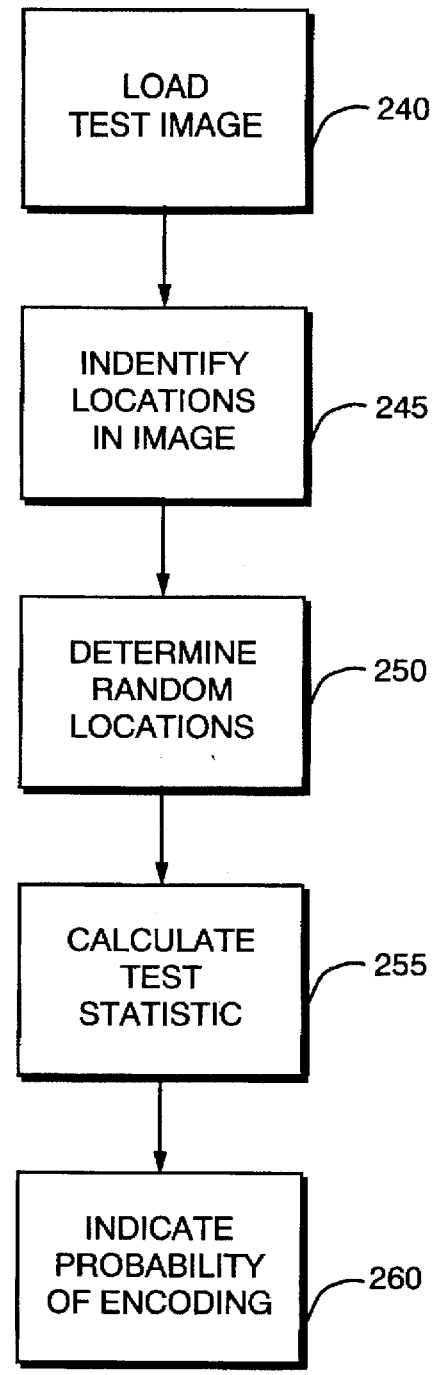
FIG. 7 is a flow chart illustrating decoding according to the invention.

As shown in FIG. 7, for decoding a particular signature in a test image, in the first step 240, the image is first loaded into one of the image buffers 162. In step 245, the module 192 performs the grid mapping or pixel mapping onto the image. If the test image has been significantly geometrically altered since encoding, meaningful assignment of grid cells to regions of the image requires information about the alteration. In response to a user command, the module 192 either retrieves this information, from the user interface 194 or from one of the databases 198, or assesses the changes based on the properties of the host image or on data encoded in the test image. The module 192 accounts for this information in the mapping.

In step 250, either the analysis module 192 retrieves the pseudo-random number series and group assignment associated with the pattern in question, or the random number generator 186 recreates it based on a key provided by the user or a database 198. In step 255, the module 192 accesses the test image stored in one of the image buffers 162 and computes the experimental value of a test statistic for the pattern being decoded. In step 260, the module 192 generates an indication of whether or not the signature pattern is present. This indication may entail simply showing on display 184 the calculated experimental value or the likelihood that it belongs to the test statistic probability density function of the unaltered host image.

It will therefore be seen that the foregoing represents a highly extensible and advantageous approach to low-bit-rate data embedding, especially for signature marking of digitally represented images. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits, or as mixed hardware-software combinations (wherein, for example, pixel manipulation and rendering is performed by dedicated hardware components).

What is claimed is:

1. A method of embedding data in an image encoded as points, each point having a parameter value, the method comprising the steps of:
    a. generating an ordered series of pseudo-random numbers;
    b. assigning each pseudo-random number of the series to a first or a second group;
    c. associating each pseudo-random number with a point;
    d. designating each point associated with a pseudo-random number assigned to the first group to be a first point each point associated with a pseudo-random number assigned to the second group to be a second point; and
    e. altering the image by
        i. increasing the parameter value of each first point and of a first patch of points surrounding each first point and
        ii. decreasing the parameter value of each second point and of a second patch of points surrounding each second point,
    thereby embedding data in the image.

2. The method of claim 1 wherein the generation of the series of pseudo-random numbers is based on a key number.

3. The method of claim 1 wherein each point corresponds to an electronically represented pixel.

4. The method of claim 1 wherein each pseudo-random number is assigned to a group by assigning alternate pseudo-random numbers in the series to the first and second groups.

5. The method of claim 4 wherein the parameter values of the points in each patch are changed by amounts having magnitudes that depend on position within the patches, the dependence being formulated on expected subsequent image processing.

6. The method of claim 4 wherein the parameter values of the points in each patch are changed by amounts having magnitudes that depend on position within the patches, the dependence being formulated on expected visual perceptibility.

7. The method of claim 1 wherein the parameter values of the points in each first patch are changed by a first constant amount and the parameter values of the points in each second patch are changed by a second constant amount.

8. The method of claim 1 wherein the parameter values of the points in each first patch are increased by a first amount and the parameter values of the points in each second patch are decreased by a second amount, the first and second amounts depending on position within the patch.

9. The method of claim 1 further comprising the step of associating each pseudo-random number with a plurality of adjacent points collectively forming a continuous patch, thereby defining several patches in the image.

10. The method of claim 9 wherein the patches are disjoint.

11. The method of claim 1 wherein the series is divided into first and second halves, each pseudo-random number being assigned to a group so that the first group comprises the numbers of the first half of the series and the second group comprises the numbers of the second half of the series.

12. The method of claim 1 wherein the ordered series comprises at least 5,000 pseudo-random numbers.

13. The method of claim 1 wherein the image is monochrome.

14. The method of claim 1 wherein the image is color.

15. The method of claim 1 wherein either of the first or second groups comprises points belonging to a plurality of subgroups, each subgroup having a subgroup amount associated therewith, and wherein the step of altering the image comprises changing the parameter value at each point belonging to a subgroup, and at points in a patch surrounding that point, by the subgroup amount associated with the subgroup to which the point belongs.

16. The method of claim 15 wherein each subgroup amount has a magnitude that is independent of position within a patch.

17. The method of claim 15 wherein each subgroup amount has a magnitude that depends on position within a patch.

18. The method of claim 1 wherein the parameter is luminance.

19. The method of claim 1 wherein the parameter is chrominance.

20. A method of embedding a pattern in a host image electronically encoded as points, each point having a parameter value, the method comprising the steps of:

a. generating an ordered series of pseudo-random numbers;

b. assigning each pseudo-random number of the series to a first or a second group;

c. mapping a grid comprising an array of cells onto the host image by assigning groups of adjacent points to the cells;

d. associating each pseudo-random number with a cell in the host image, each group of points assigned to a cell so associated with a pseudo-random number being designated a patch;

e. further designating each patch in the host image associated with a pseudo-random number assigned to the first group to be a first patch and each patch in the host image associated with a pseudo-random number assigned to the second group to be a second patch; and f. altering the host image by increasing the parameter values of points in each first patch and decreasing the parameter values of points in each second patch, thereby embedding the pattern in the host image.

21. The method of claim 20 wherein each pseudo-random number is assigned to a group by assigning alternate pseudo-random numbers in the series to the first and second groups.

22. The method of claim 20 wherein the cells are rectangular.

23. The method of claim 20 wherein the cells are hexagonal.

24. The method of claim 20 wherein the generation of the series of pseudo-random numbers is based on a key number.

25. The method of claim 20 wherein each point corresponds to an electronically represented pixel.

26. The method of claim 20 wherein the parameter values of the points in each first patch are changed by a first constant amount and the parameter values of the points in each second patch are changed by a second constant amount.

27. The method of claim 20 wherein the parameter values of the points in each first patch are changed by a first varying amount and the parameter values of the points in each second patch are changed by a second varying amount.

28. The method of claim 20 wherein the parameter values of the points in each patch are changed by amounts having magnitudes that depend on position within the patches, the dependence being formulated based on expected subsequent image processing.

29. The method of claim 20 wherein the parameter values of the points in each patch are changed by amounts having magnitudes that depend on position within the patches, the dependence being formulated based on expected visual perceptibility.

30. The method of claim 20 wherein the image is color.

31. The method of claim 20 wherein the image is monochrome.

32. A method for determining whether a test image, encoded as points, each point having a parameter value, contains data embedded according to the method of claim 20, the method comprising the steps of:

a. providing the series of pseudo-random numbers and assignment of each number to the first or the second group;

b. mapping a grid comprising an array of nonoverlapping cells onto the test image by assigning groups of adjacent points in the test image to the cells;

c. associating each pseudo-random number with a cell in the test image, the points assigned to each cell so associated with a pseudo-random number being designated a patch:

d. further designating each patch in the test image associated with a pseudo-random number assigned to the first group to be a first patch and each patch in the test image associated with a pseudo-random number assigned to the second group to be a second patch; and e. calculating a value of a test statistic, comprising the parameter values at the first and second patches in the test image, formulated to reflect the pattern, the test statistic indicating whether the pattern is present in the test image.

33. The method of claim 32 wherein the test statistic comprises only parameter values at one designated point for each patch.

34. The method of claim 33 wherein each patch has a centroid point and the one designated point is the centroid point.

35. The method of claim 32 wherein the determination is generated based on a cumulative distribution function of a Gaussian probability distribution function of the test statistic in the unaltered host image.

36. The method of claim 32 wherein the test statistic is a linear combination of several instances of first and second functions of the parameter values at the first and second patches, respectively.

37. The method of claim 32 wherein each point in the test image corresponds to an electronically encoded pixel.

38. The method of claim 32 wherein the step of mapping a grid is performed so as to account for post-embedding geometric transformation of the host image.

39. The method of claim 32 wherein the test statistic is the difference between the sum of the parameter values of the first points and the sum of the parameter values of the second points.

40. The method of claim 32 wherein the parameter is luminance.

41. The method of claim 32 wherein the parameter is chrominance.

42. The apparatus of claim 32 wherein the test statistic is a linear combination of several instances of first and second functions of the parameter values in the first and second patches, respectively, in the test image.

43. The method of claim 20 wherein the series is divided into first and second halves, each pseudo-random number being assigned to a group so that the first group comprises the numbers of the first half of the series and the second group comprises the numbers of the second half of the series.

44. The method of claim 20 wherein either of the first or second groups comprises patches belonging to a plurality of subgroups, each subgroup having a subgroup amount associated therewith, and wherein the step of altering the image comprises changing the parameter values at points in each patch by the subgroup amount associated with the subgroup to which the patch belongs.

45. The method of claim 44 wherein each subgroup amount has a magnitude that is independent of position within a patch.

46. The method of claim 44 wherein each subgroup amount has a magnitude that depends on position within a patch.

47. The method of claim 20 wherein the parameter is luminance.

48. The method of claim 20 wherein the parameter is chrominance.

49. A method for determining whether a test image, encoded as points, each point having a parameter value, contains a pattern embedded in a host image by altering the host image by increasing and decreasing the parameter values of host image points designated as respective first and second host image points according to an association of each first or second point with a pseudo-random number of a series, of which each number is assigned to a first or a second group, the method comprising the steps of:

a. providing the series of pseudo-random numbers and assignment of each number to the first or the second group;
 b. associating each pseudo-random number with a point in the test image;
 c. designating each point in the test image associated with a pseudo-random number assigned to the first group to be a first point and each point associated with a pseudo-random number assigned to the second group to be a second point; and
 d. calculating a value of a test statistic, comprising the parameter values at the first and second points in the test image, formulated to reflect the pattern, the test statistic indicating whether the pattern is present in the test image.

50. The method of claim 49 wherein the determination is generated based on a cumulative distribution function of a Gaussian probability distribution function of the test statistic in the unaltered host image.

51. The method of claim 49 wherein the test statistic is a linear combination of several instances of first and second functions of the parameter values at the first and second points, respectively.

52. The method of claim 49 wherein each point in the test image corresponds to an electronically represented pixel.

53. The method of claim 49 wherein the step of associating each pseudo-random number with a point in the test image is performed so as to account for post-embedding geometric transformation of the host image.

54. The method of claim 49 wherein the test statistic is the difference between the sum of the parameter values of the first points and the sum of the parameter values of the second points.

55. The method of claim 49 wherein the parameter is luminance.

56. The method of claim 49 wherein the parameter is chrominance.

57. The apparatus of claim 49 wherein the test statistic is linear combination of several instances of first and second functions of the parameter values at the first and second points, respectively, in the test image.

58. An apparatus for embedding data in an image, the apparatus comprising:

a. a computer memory for storing the image as an ordered set of pixels, each pixel having a pixel parameter value;
 b. means for generating a series of ordered pseudo-random numbers;
 c. means for assigning each pseudo-random number to a first or a second group;
 d. means for associating each pseudo-random number with a pixel and designating each pixel associated with a pseudo-random number assigned to the first group to be a first pixel and each pixel associated with a pseudo-random number of the second group to be a second pixel; and
 e. means for creating an altered image by
  i. increasing the pixel parameter value of each first pixel and of a first patch of pixels surrounding each first pixel and
  ii. decreasing the pixel parameter value of each second pixel and of a second patch of pixels surrounding each second pixel,
 thereby embedding data in the image.

59. The apparatus of claim 58 wherein the means for generating a series of numbers generates the numbers based on a key.

60. The apparatus of claim 58 wherein the assigning means assigns each pseudo-random number to a group by assigning alternate pseudo-random numbers in the series to the first and second groups.

61. The apparatus of claim 60 wherein the image-altering means increases the pixel parameter values of the pixels in each first patch by a first constant amount and decreases the pixel parameter values of the pixels in each second patch by a second constant amount.

62. The apparatus of claim 60 wherein the image-altering means increases the pixel parameter values of the pixels in each first patch by a first amount and decreases the pixel parameter values of the pixels in each second patch by a second varying amount, the first and second amounts depending on position within the patch.

63. The apparatus of claim 58 wherein the series-generating means generates a series having at least 5,000 pseudo-random numbers.

64. The apparatus of claim 58 wherein the image-altering means changes the pixel parameter values of the points by amounts based on expected subsequent image processing.

65. The apparatus of claim 58 wherein the image-altering means changes the pixel parameter values of the points by amounts based on visual perceptibility.

66. The apparatus of claim 58 wherein the series is divided into first and second halves, and the assigning means assigns each pseudo-random number to a group so that the first group comprises the numbers of the first half of the series and the second group comprises the numbers of the first half of the series.

67. The apparatus of claim 58 wherein either of the first or second groups comprises patches belonging to a plurality of subgroups, each subgroup having a subgroup amount associated therewith, and wherein the means for creating an altered image changes the parameter value at points in each patch by the subgroup amount associated with the subgroup to which the patch belongs.

68. The apparatus of claim 67 wherein each subgroup amount has a magnitude that is independent of position within a patch.

69. The apparatus of claim 67 wherein each subgroup amount has a magnitude that depends on position within a patch.

70. An apparatus for determining whether a test image, electronically encoded as points, each point having a parameter value, contains a pattern embedded in a host image by associating each number of a pseudo-random series with a point in the host image, each number being assigned to a first or a second group, and designating each point in the host image associated with a pseudo-random number assigned to the first group to be a first point and each point associated with a pseudo-random number assigned to the second group to be a second point, and altering the host image by increasing the parameter value of each first point in the host image and decreasing the parameter value of each second point in the host image, the apparatus comprising:

a. means for providing the series of pseudo-random numbers and assignment of each number to the first or second group;

b. means for associating each pseudo-random number with a point in the test image;

c. means for designating each point in the test image associated with a pseudo-random number assigned to the first group to be a first point and each point associated with a pseudo-random number assigned to the second group to be a second point;

d. means for calculating a test statistic, comprising the parameter values at the first and second points in the test image, formulated to reflect the pattern.

71. The apparatus of claim 70 further comprising means for generating an indication of whether the test image contains the pattern.

72. The apparatus of claim 71 wherein the indication-generating means generates an indication based on a cumulative distribution function of the test statistic in the unaltered host image.

73. The apparatus of claim 70 wherein the associating means associates each pseudo-random number with a point in the test image so as to account for post-embedding geometric transformation of the host image.

74. The apparatus of claim 70 wherein the test statistic is a linear combination of several instances of first and second functions of the parameter values at the first and second points, respectively.

75. The apparatus of claim 70 wherein the test statistic is the difference between the sum of the parameter values of the first points and the sum of the parameter values of the second points.

76. The apparatus of claim 70 wherein the parameter is luminance.

77. The apparatus of claim 70 wherein the parameter is chrominance.

78. An image created by altering a host image comprised of points, each point having a parameter value, by associating each number of a pseudo-random series with a point, each number being assigned to a first or a second group, and designating each point associated with a pseudo-random number assigned to the first group to be a first point and each point associated with a pseudo-random number assigned to the second group to be a second point, and increasing the parameter value of each first point and decreasing the parameter value of each second point.

79. The image of claim 78 wherein the image is a photograph.

80. The image of claim 78 wherein the image is an electronically encoded array of pixels.

81. The image of claim 78 wherein the series is divided into first and second halves, each pseudo-random number being assigned to a group so that the first group comprises the numbers of the first half of the series and the second group comprises the numbers of the second half of the series.

82. The image of claim 78 wherein each pseudo-random number is assigned to a group by assigning alternate pseudo-random numbers in the series to the first and second groups.

83. The image of claim 78 wherein the image is a print or lithograph.

84. The image of claim 70 wherein the parameter is luminance.

85. The image of claim 70 wherein the parameter is chrominance.

* * * * *